G. H. LAW.
ROLLING AUTOMOBILE JACK.
APPLICATION FILED AUG. 23, 1915 RENEWED OCT. 25, 1919.
1,339,827.
Patented May 11, 1920.
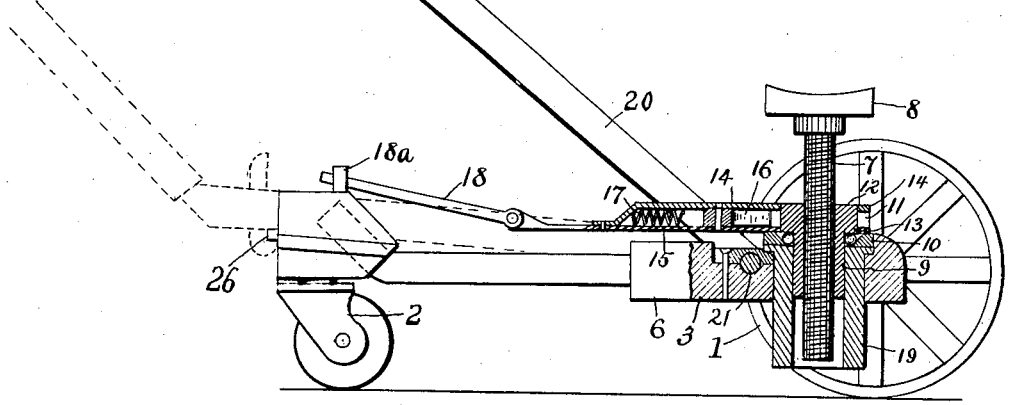
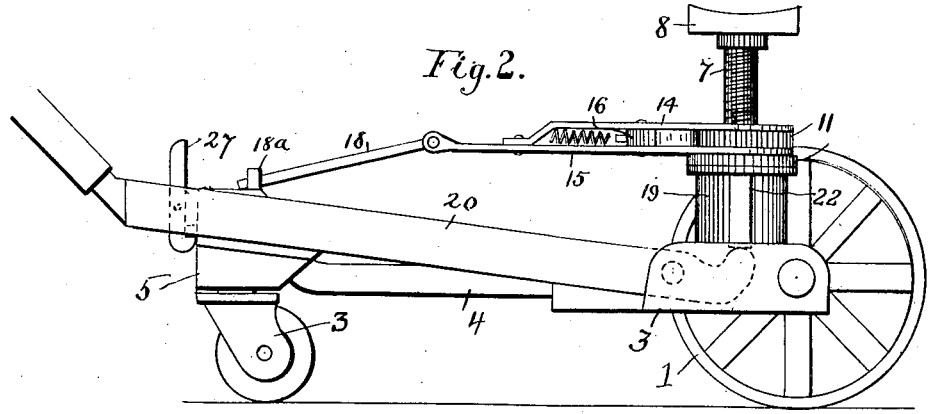
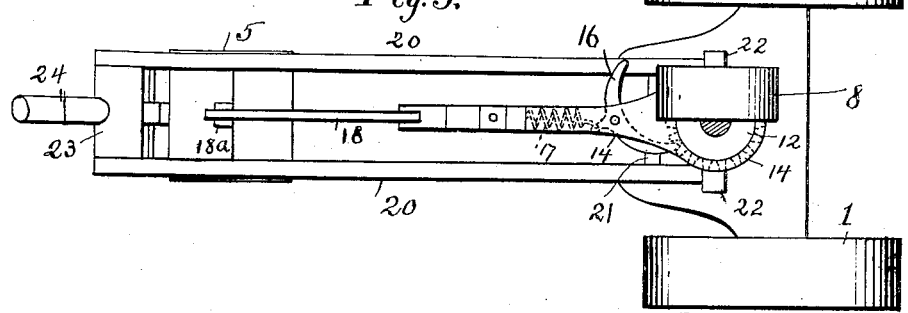

UNITED STATES PATENT OFFICE.

GEORGE H. LAW, OF PORTLAND, MAINE.

ROLLING AUTOMOBILE-JACK.

1,339,827.      Specification of Letters Patent.      Patented May 11, 1920.

Application filed August 23, 1915, Serial No. 47,005. Renewed October 25, 1919. Serial No. 333,374.

*To all whom it may concern:*

Be it known that I, GEORGE H. LAW, of Portland, in the county of Cumberland and State of Maine, have invented certain new and useful Improvements in Rolling Automobile-Jacks, of which the following is a specification.

My invention relates to a rolling jack designed chiefly for handling automobiles in the garage.

The object of the invention is to make a jack supported by trucks which is capable of being easily and quickly inserted and used under the axle of an automobile in whatever the position the latter may chance to be, the jack being so constructed as to be capable of general use about the garage.

My invention may best be understood by reference to the accompanying drawing in which is shown a jack constructed in accordance with my invention.

In the drawing—

Figure 1 is a central vertical section with a portion in elevation,

Fig. 2 is a side elevation, and

Fig. 3 is a plan.

In the drawing similar reference numerals indicate similar parts.

The jack is supported by a pair of trucks 1, 1, and a caster 2, forming a triangular bearing which makes it capable of being rolled about on the floor of a garage or in other similar situations. The jack proper is carried by the carriage 3 which is supported by the trucks 1, 1.

A tongue 4 extends forward from the carriage and at the forward end of the tongue is a casting 5 to which is secured the caster 3.

As here shown the tongue 4 is composed of a section of pipe which fits into a hub 6 formed on the carriage and the forward end of the tongue fits in a cavity formed in the casting 5.

The jack is made of a lifting screw 7 having on its upper end a cap 8, the screw engaging a cylindrical nut 9. The upper portion of the nut is enlarged to form an annular shoulder which rests on a series of balls which in turn rest on an annular cone or ball race 10. The ball race is supported on the upper end of a sleeve 19 which fits in a vertical opening in the carriage in such a way as to be capable of sliding vertically. On the enlarged portion of the nut is a ratchet gear 11 formed as here shown as an integral part of the nut. The ratchet gear 11 forms the central portion of the enlarged end, the portion above and below the gear being formed into hubs 12 and 13 for forming pivoting centers for a pawl carrying arm. This arm is made up of an upper plate 14 pivoted on the hub 12 and a lower plate 15 pivoted on the hub 13, the two plates being riveted or otherwise secured together leaving a space between them in which is pivoted the pawl.

The pawl 16 is formed double so that it will work in either direction, the ends being adapted to engage the teeth of the ratchet gear 11. A spring presses against the pawl in such a manner as to keep one end or the other in engagement with the ratchet gear 11 according as the pawl is swung one way or the other.

To the forward end of the arm 13—14 is pivoted a handle by which the arm 13—14 may be vibrated to operate the nut when it is not possible to vibrate the main lever.

The sleeve 19 is raised and lowered by means of a lever 20 composed of a pair of parallel side bars pivoted to the carriage forward of the sleeve by means of a cross pin 21 which extends from one side to the other, and the pin 21 is journaled in a suitable bearing in the carriage 3. The sleeve has formed at its sides lugs 22 which fit in vertical grooves in the carriage and the rear ends of the bars 20 impinge on the lower ends of the lugs to raise the sleeve.

The bars 20 are joined at their forward ends by a connecting piece 23 to which a suitable operating handle is attached.

As here shown the connecting piece 23 has formed on it hub 24 over which is slipped a tubular handle 25 which may be of any desired length or form.

Means are provided for locking this lever 20 in its lower position with the jack in its raised position.

As here shown I pivot a catch 27 between the bars 20 immediately in rear of the piece 23. This latch is adapted to catch on the projection 26 on the casting 5 and a spring 28 holds it in engagement. The operation of my jack is as follows:

When the forward axle of the automobile is to be raised, and there is plenty of room to swing the handle 25, the lever 20 is lifted to the position shown in Fig. 1 after releasing the catch 27 by the foot. This lowers the sleeve to the lower position and brings the cap 8 into a position well under the axle. The lever 20 is now dropped and locked and this raises the sleeve to a position where it lifts the axle from the floor. This is sufficient in ordinary cases to move the automobile around the garage, but if it is desired to raise the axle farther, the power of the screw is applied to lift the automobile by laterally vibrating the handle 25 and all the attached parts. This motion causes the pawl to act on the ratchet gear in the usual way thus turning the nut and raising the screw. The fact that the friction of the screw threads is greater than the friction of the nut on its ball bearings enables this vibrating motion to turn the nut in one direction.

When the motion is to be reversed and the screw lowered, the pawl is pushed over with the foot and the opposite end will engage the ratchet gear.

When the jack is in a position where the main handle lever cannot be vibrated laterally as is very liable to happen in a garage, the handle 18 is disconnected from the guide 18ª which holds it in its normal position and the screw may then be raised and lowered by the motions of the arm 14—15. When the weight of the axle is on the cap 8 and the forward wheels of the automobile are raised from the floor the car may be rolled along the floor and worked into any desired position.

As is evident, a very powerful leverage is obtained when the long handle which is used for drawing the jack and the automobile about is used for working the screw.

It will be seen that a variety of means are provided for raising the jack, that is, the lever 20, the handle 18 and the vibrating action of the entire carriage. The jack is thus able to handle any form of automobile however heavy and to do it quickly with a limited amount of lifting power or slowly with a powerful screw action as suits various needs.

It is evident that many variations and modifications from the form illustrated may be made while keeping within the limits of the appended claims.

I claim:

1. In a rolling jack, a wheeled carriage, a sleeve mounted for vertical movement in said carriage, a nut rotatably mounted in said sleeve, a lifting screw mounted in said nut, means for raising and lowering the sleeve, and means for rotating the nut to raise or lower the screw.

2. In a rolling jack, a wheeled carriage, a sleeve mounted for vertical movement in the carriage, a nut rotatably mounted in the sleeve, a lifting screw mounted in the nut, a lever pivoted to the carriage to raise and lower the sleeve, means to rotate the nut, and means to fasten said nut operating means to the carriage whereby a lateral swinging movement of the carriage as a whole will operate the nut to raise and lower the screw.

3. In a rolling jack, a wheeled carriage, a sleeve mounted for vertical movement in the carriage, a nut rotatably mounted in the sleeve, a lifting screw mounted in the nut, means to rotate the nut, and means whereby, upon a lateral swinging movement of the jack as a whole, the nut operating means is whole will operate the nut to raise or lower the screw.

4. In a rolling jack, a wheeled carriage, a sleeve mounted for vertical movement in the carriage, a nut rotatably mounted in the sleeve, a lifting screw mounted in the nut, roller bearings carried by said sleeve to support said nut, a ratchet carried by said nut, a pawl engaging said ratchet, a lever pivoted to said carriage, means whereby when the lever is vibrated laterally the pawl will be operated to raise or lower said lifting screw, and means whereby when the lever is operated vertically, the said sleeve will be raised or lowered, and means for holding said sleeve in its raised position.

5. In a rolling jack, a wheeled carriage, a sleeve mounted for vertical movement in said carriage, a nut rotatably mounted in said sleeve, a lifting screw mounted in said nut, a lever pivoted to the carriage, and means for raising or lowering the said sleeve upon movement of the lever in one path, and means for rotating said nut and thereby raising or lowering said lifting screw upon movement of the lever in another path.

6. In a rolling jack, the combination of a wheeled supporting means, a nut journaled in the supporting means, a ratchet gear on said nut, a pawl pivoted on the supporting means for engagement with said ratchet gear, a screw coacting with said nut, means for holding said screw against rotation when in operative engagement with the work, whereby upon swinging movement of the wheeled supporting means and the pawl from side to side, the ratchet gear and nut will be turned by the pawl and the screw raised or lowered in the nut.

7. In a rolling jack, a wheeled carriage, a sleeve mounted for vertical movement in the carriage, an internally threaded nut rotatably mounted in the sleeve, an anti-friction support for the nut, a lifting screw mounted in screw threaded engagement with the nut, means for rotating the nut thereby raising said lifting screw, and means for raising said sleeve thereby raising the nut and lifting screw with said sleeve.

8. In a rolling jack, the combination of a pair of trucks and a caster, a carriage supported thereby, a vertically movable sleeve carried by the carriage, a nut journaled in said sleeve, a ratchet gear on the nut, a pawl on the carriage for engaging the ratchet gear, a lever for lifting the sleeve and an operating handle for the carriage.

9. In a rolling jack, the combination of a pair of wheels and a caster, a carriage supported thereby, a vertically movable sleeve carried by the carriage, a nut journaled in the sleeve, a ratchet gear on the nut, a pawl on the carriage for engaging the ratchet gear, a lever pivoted to the carriage for lifting the sleeve, a latch for holding the lever in its operative position, and an operating handle for the carriage.

10. In a rolling jack, the combination of a wheeled carriage, a nut journaled in the carriage, a lifting screw coacting with said nut, a ratchet gear on the nut, an arm pivoted with relation to said nut, a pawl on said arm for engaging the ratchet and releasable means for engaging said arm and said carriage whereby the screw may be raised by a lateral vibration of the arm or a lateral vibration of the carriage as a whole.

In testimony whereof I have affixed my signature.

GEORGE H. LAW.